US009954895B2

(12) United States Patent
Chen (10) Patent No.: US 9,954,895 B2
(45) Date of Patent: *Apr. 24, 2018

(54) SYSTEM AND METHOD FOR IDENTIFYING PHISHING WEBSITE

(71) Applicant: BEIJING QIHOO TECHNOLOGY COMPANY LIMITED, Beijing (CN)

(72) Inventor: Yingying Chen, Beijing (CN)

(73) Assignee: BEIJING QIHOO TECHNOLOGY COMPANY LIMITED, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/359,131

(22) Filed: Nov. 22, 2016

(65) Prior Publication Data

US 2017/0078327 A1    Mar. 16, 2017

Related U.S. Application Data

(63) Continuation of application No. 14/411,466, filed as application No. PCT/CN2013/075949 on May 21, 2013, now Pat. No. 9,531,751.

(30) Foreign Application Priority Data

Jun. 28, 2012  (CN) .......................... 2012 1 0224485

(51) Int. Cl.
*H04L 12/24* (2006.01)
*H04L 29/06* (2006.01)
(Continued)

(52) U.S. Cl.
CPC .... *H04L 63/1483* (2013.01); *G06F 17/30864* (2013.01); *G06F 17/30887* (2013.01);
(Continued)

(58) Field of Classification Search
CPC .................................................... G06F 21/128
See application file for complete search history.

(56) References Cited

U.S. PATENT DOCUMENTS 7,630,987 B1  12/2009 Renfro et al.
7,958,555 B1   6/2011 Chen et al.
(Continued)

FOREIGN PATENT DOCUMENTS

CN   101145902 A    3/2008
CN   101667979 A    3/2010
CN   102801709 A   11/2012

*Primary Examiner* — Josnel Jeudy
(74) *Attorney, Agent, or Firm* — Baker & Hostetler LLP (57) ABSTRACT

The present invention discloses a system and method for identifying a phishing website. The system comprises: a domain name acquisition unit, a domain name statistic unit and a website identification unit; the domain name acquisition unit being configured to collect all links found in a website to be identified so as to acquire the domain names corresponding to the links; the domain name statistic unit being configured to carry out a statistic on the number of times that the domain names occur in the website to be identified, and finding the domain name which has the most number of occurrences and mark it as a target domain name; and the website identification unit being configured to judge whether the website to be identified is a phishing website on the basis of the target domain name and the domain name of the website to be identified.

15 Claims, 6 Drawing Sheets

(51) Int. Cl.
 *G06F 17/30* (2006.01)
 *H04L 29/08* (2006.01)
 *H04L 29/12* (2006.01)
(52) U.S. Cl.
 CPC .......... *H04L 63/1416* (2013.01); *H04L 61/30* (2013.01); *H04L 67/02* (2013.01)

(56) References Cited

U.S. PATENT DOCUMENTS

2008/0092242 A1   4/2008  Rowley
2008/0270376 A1*  10/2008  Svore ................. G06F 17/3089

\* cited by examiner

ABSTRACT# SYSTEM AND METHOD FOR IDENTIFYING PHISHING WEBSITE

CROSS REFERENCE TO RELATED APPLICATION

This application is a continuation of U.S. patent application Ser. No. 14/411,466 filed Dec. 26, 2014 (now allowed), which was filed as the 371 U.S. national stage application of Patent Application No. PCT/CN2013/075949, filed May 21, 2013, which in turn claims the benefit of Chinese Patent Application Number 201210224485.3 filed Jun. 28, 2012, the entire contents of which are hereby incorporated by reference.

TECHNICAL FIELD

The present invention relates to the field of network security technology, and in particular, to a system and method for identifying a phishing website.

BACKGROUND ART

With the development of Internet, the number of netizens increases year by year. In addition to traditional threat of Trojans, viruses and the like, a number of phishing websites increase drastically on the Internet in the past two years.

Currently, the major technology of identifying phishing websites is to build a knowledge database by collecting common phishing websites, and then calculate a similarity between a newly found webpage with the phishing websites in the knowledge database, so as to judge whether it is a phishing website.

The above method for identifying a phishing website by the knowledge database of phishing websites can usually just identify known types of phishing websites, but fails to recognize a new type of phishing website. For example, when the knowledge database of phishing websites has only phishing websites related to the Bank of China, it will not be able to identify a phishing website which counterfeits the Industrial and Commercial Bank of China.

SUMMARY OF THE INVENTION

In view of the above problems, the present invention is to provide a system and method for identifying a phishing website, to overcome the above problems or at least partially solve or reduce the number of the above mentioned problems.

According to one aspect of the invention, a system is provided for identifying a phishing website, comprising: a domain name acquisition unit, a domain name statistic unit and a website identification unit; said domain name acquisition unit is configured to collect all links found from a website to be identified so as to acquire the domain names corresponding to the links; said domain name statistic unit is configured to carry out a statistic on the number of times that the domain names occur in the website to be identified, and to find the domain name which has the most number of occurrences and mark it as a target domain name; and said website identification unit is configured to judge e whether the website to be identified is a phishing website on the basis of the target domain name and the domain name of the website of the website to be identified.

According to another aspect of the invention, a method is provided for identifying a phishing website, comprising steps of: collecting all the links found in a website to be identified to obtain the domain names corresponding to the links; carrying out a statistic on the number of times that the domain names occur in the website to be identified, and finding the domain name which has the most number of occurrences and marking it as a targeted domain name; and judge whether the website to be identified is a phishing website on the basis of the targeted domain name and the domain name of the website of the website to be identified.

According to still another aspect of the invention, a computer program is provided, comprising computer readable codes, wherein a server executes the method for identifying a phishing website when the computer readable codes are operated on the server.

According to still another aspect of the invention, a computer readable medium is provided, in which the computer program is stored.

Advantages of the invention are as follows:
The system and method for identifying a phishing website according to the invention may efficiently identify new types of phishing websites by identifying the phishing websites based on the relations of the links in the websites; meanwhile, it is easy to increase the number and types of the phishing websites in the phishing website database, so as to further identify and search the phishing websites easily, thereby have broad application prospects in the field of network security.

The above description is merely an overview of the technical solution of the present invention. In order to more clearly understand the technical solution of the present invention to implement in accordance with the contents of the description, and to make the foregoing and other objects, features and advantages of the invention more apparent, detailed embodiments of the invention will be provided below.

BRIEF DESCRIPTION OF THE DRAWINGS

Through reading the detailed description of the following preferred embodiments, various further advantages and benefits will become apparent to an ordinary skilled in the art. Drawings are merely provided for the purpose of illustrating the preferred embodiments and are not intended to limit the invention. Further, throughout the drawings, same elements are indicated by same reference numbers. In the drawings.

DETAILED DESCRIPTION OF THE EMBODIMENTS

Hereafter, the present invention will be further described in connection with the drawings and the specific embodiments.

Figure 1:
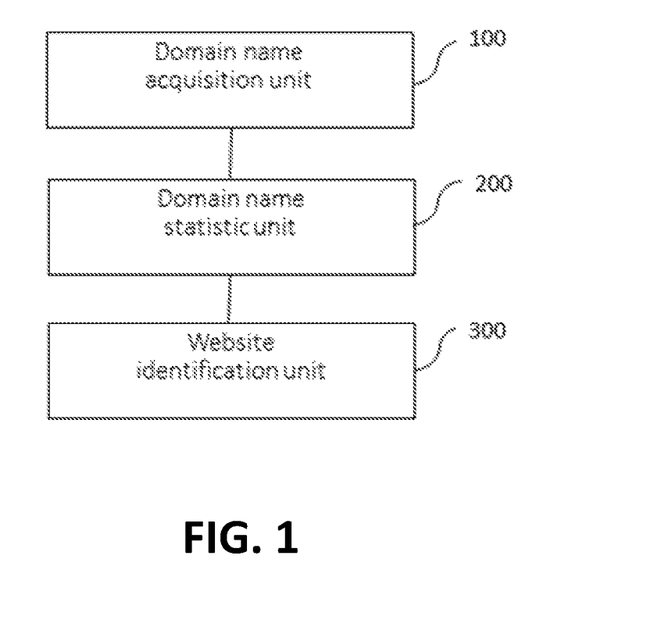
FIG. 1 is a schematic block diagram showing a system for identifying one or more phishing website(s) according to a first embodiment of the present invention.

FIG. 1 is a schematic modular block diagram showing a system for identifying one or more phishing website(s) according to a first embodiment of the present invention. As shown in FIG. 1, the system may comprise: a domain name acquisition unit 100, a domain name statistic unit 200 and a website identification unit 300.

Said domain name acquisition unit 100 is configured to collect all links found in a website to be identified to acquire the domain names corresponding to the links. The domain names corresponding to the links described herein are absolute addresses of the links, and if a link found in the website to be identified uses a relative address, it is required to be converted to an absolute address.

Said domain name statistic unit 200 is configured to carry out a statistic on the number of times that the domain names occur in the website to be identified, and to find the domain name which has the most frequent occurrences as a target domain name. The domain name statistic unit 200 may generate a key-value table with the domain name as "key" and the number of occurrences as "value", then order the domain names based on the numerical value of "value" in the table to obtain the domain name that has the most frequent occurrences.

Said website identification unit 300 is configured to determine whether the website to be identified is a phishing website on the basis of the target domain name and the domain name of the website of the website to be identified.

Figure 2:
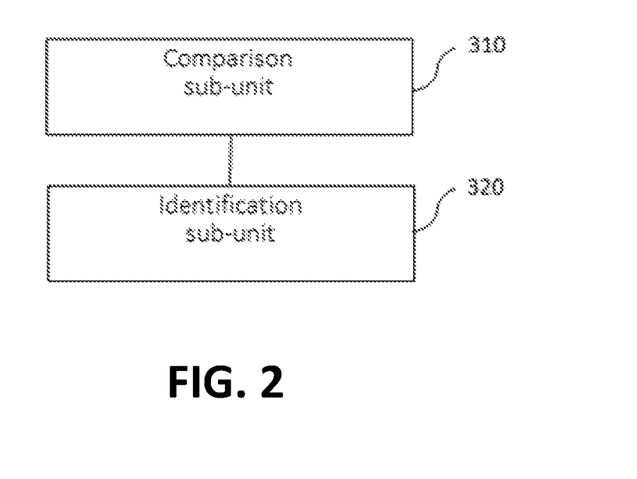
FIG. 2 is a schematic modular block diagram of the website identification unit.

FIG. 2 is a schematic modular block diagram showing a website identification unit. As shown in FIG. 2, the website identification unit 300 may further include: a comparison sub-unit 310 and an identification sub-unit 320.

Said comparison sub-unit 310 is configured to compare the target domain name and the domain name of the website, and judge the website to be identified is not a phishing website when the comparison result shows that the target domain name is the same as the domain name of the website.

Said identification sub-unit 320 is configured to calculate a ratio of the number occurrences of the target domain name to those of the domain name of the website when the target domain name is different from the domain name of the website, and calculate a similarity between the target domain name and the domain name of the website, and then judge whether the website to be identified is a phishing website according to the ratio and the similarity.

Figure 3:
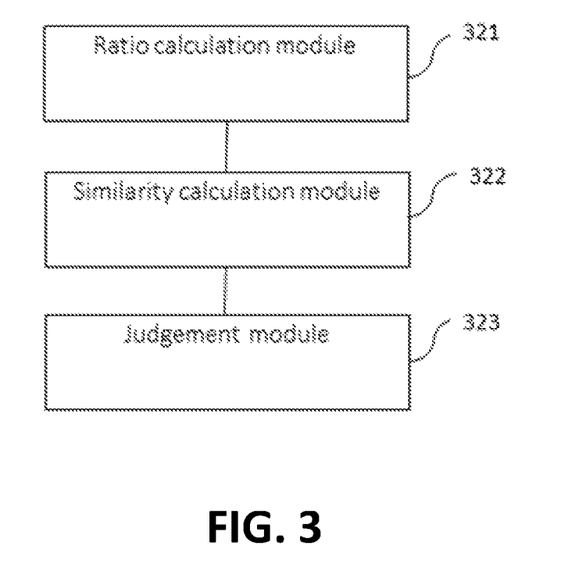
FIG. 3 is a schematic modular block diagram of the identification sub-unit.

FIG. 3 is a schematic modular block diagram of the identification sub-unit. As shown in FIG. 3, said identification sub-unit 320 may further include: a ratio calculation module 321, a similarity calculation module 322 and a judgement module 323.

Said ratio calculation module 321 is configured to calculate the ratio of the number occurrences of the target domain name to those of the domain name of the website.

Said similarity calculation module 322 is configured to calculate the similarity between the target domain name and the domain name of the website.

Figure 4:
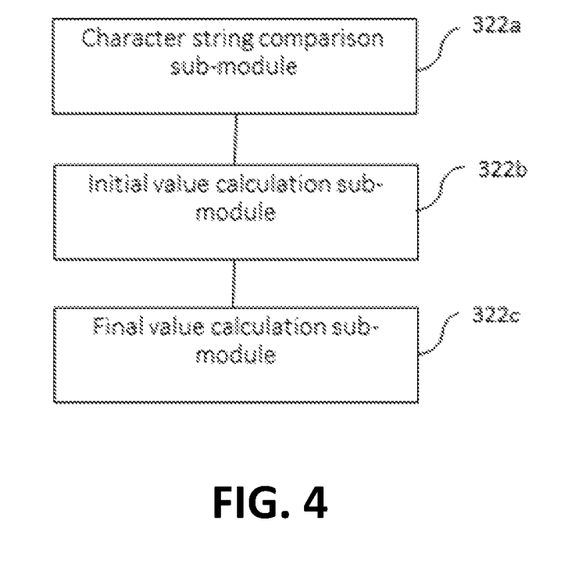
FIG. 4 is a schematic modular block diagram of the similarity calculation module.

FIG. 4 is a schematic modular block diagram of the similarity calculation module. As shown in FIG. 4, said similarity calculation module 322 may further include: a character string comparison sub-module 322a, an initial value calculation sub-module 322b and a final value calculation sub-module 322c.

Said character string comparison sub-module 322a is configured to establish a comparison array of character string of the target domain name and said character string of the domain name of the website, wherein the character string of the target domain name is arranged in the first line of the comparison array and kept in a fixed position, and the character string of the domain name of the website is arranged in the second line of the comparison array and moved from the left side to the right side so as to compare the overlapped characters in the two lines of strings.

Said initial value calculation sub-module 322b is configured to calculate a first similarity value Q1 between the target domain name and the domain name of the website when the first character of the target domain name is aligned with the last character of the domain name of the website; calculate a second similarity value Q2 between the target domain name and the domain name of the website when the second character of the target domain name is aligned with the last character of the domain name of the website; in this manner, calculate a m-th similarity value $Q_m$ between the target domain name and the domain name of the website when the last character of the target domain name is aligned with the first character of the domain name of the website; wherein, $m=n_1+n_2-1$, $n_1$ represents the string length of the target domain name, and $n_2$ represents the string length of the domain name of the website.

Wherein, in said initial value calculation sub-module 322b, the i-th similarity value $Q_i$ may be calculated in the following formula:

$$Q_i = M_i^2 \times L_i;$$

wherein, i is a natural number and $1 \leq i \leq m$; and, $$M_i = s_i / n_{max};$$

$$L_i = r_i / n_{max};$$

wherein, $r_i$ represents the number of overlapped characters in the character string of the domain name of the website and the character string of the target domain name for the i-th comparison; $n_{max}$ represents the number of characters of the relatively longer character string between the character string of the domain name of the website and the character string of the target domain name; $L_i$ represents the overlapped ratio of the character string of the domain name of the website to the character string of the target domain name for the i-th comparison; $S_i$ represents the number of overlapped and identical characters in the character string of the domain name of the website and the character string of the target domain name for the i-th comparison; and $M_i$ represents a matching ratio of the character string of the domain name of the website to the character string of the target domain name for the i-th comparison.

For example, it is assumed that the domain name of the website is boc.cn moved from the left side to the right side, and the target domain name is cocc.cn which is kept in a fixed position. For the first comparison, only the character n overlaps the character c, and correspondingly, $r_1=1$, $s_1=0$; for the second comparison, the character n overlaps the character o, the character c overlaps the character c, and correspondingly, $r_2=2$, $s_2=1$.

Additionally, in said initial value calculation sub-module, the i-th similarity value $Q_i$ may also be calculated in the following way:

for the i-th comparison, calculating the number of overlapped and identical characters in the character string of the target domain name and the character string of the domain name of the website, and taking the number of the overlapped and identical characters as the i-th similarity value $Q_i$.

The way of calculation of the i-th similarity value $Q_i$ can also be implemented by other commonly known methods. Since the known methods are not a key point of the present invention, the description thereof will not be repeated.

Said final value calculation sub-module 322c is configured to calculate a similarity $Q_{max}$ between the target domain name and the domain name of the website based on the following formula:

$$Q_{max}=\max\{Q_1, Q_2, Q_3 \ldots Q_m\}$$

Said judgement module 323 is configured to judge whether the ratio and the similarity satisfy the following requirements: said ratio is greater than a predetermined ratio, and said similarity is greater than a predetermined threshold; and if yes, judge that the website to be identified is a phishing website; otherwise, judge that the website to be identified is not a phishing website. The predetermined ratio and the predetermined threshold can be set and adjusted according to the actual use. In this embodiment, the predetermined ratio is preferably 1.0, and said predetermined threshold value is preferably 80%.

Figure 5:
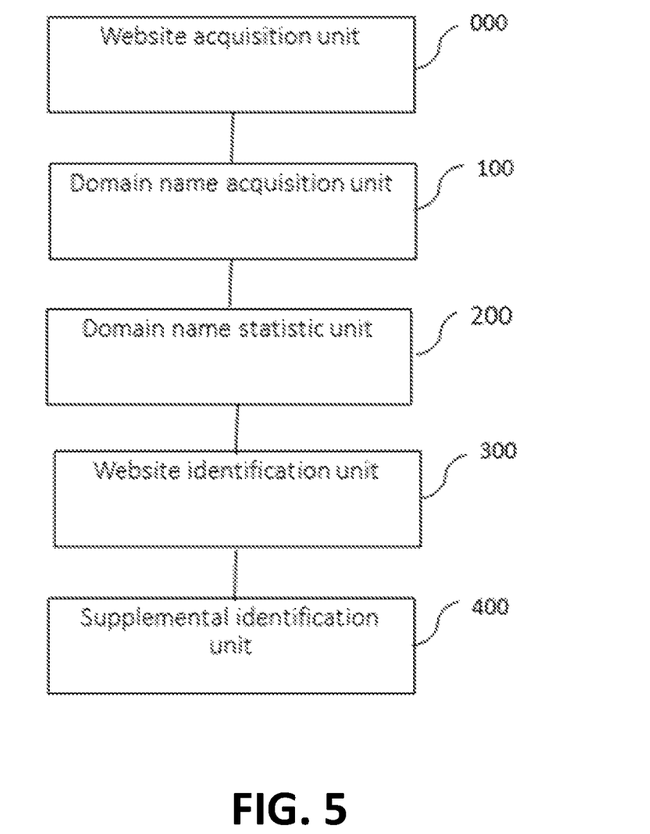
FIG. 5 is a schematic modular block diagram showing a system for identifying one or more phishing website(s) according to a second embodiment of the present invention.

FIG. 5 is a schematic modular block diagram showing a system for identifying a phishing website according to a second embodiment of the present invention. As shown in FIG. 5, the system in this embodiment is substantially the same as the system in the first embodiment, and the difference merely lies in that this embodiment further includes: a website acquisition unit 000 and a supplemental identification unit 400.

Said website acquisition unit 000 is configured to search newly established websites as websites to be identified. Generally, the phishing websites are mostly new websites. Thus, by setting the website acquisition unit 000 to merely take the newly established website as the website to be identified, the scope of identifying the phishing websites can be narrowed, and the accuracy as well as the speed of identification can be improved. Searching the newly established website can adopt the following method: monitoring the search engine result page through special key words; or, finding websites that netizens seldom visit through the clients.

Said supplemental identification unit 400 is configured to mark the website to be identified as a suspicious website when the judgement result is a phishing website, provide a supplemental identification to the suspicious website and send the suspicious website to a phishing website database if the suspicious website is still identified as a phishing website according to the supplemental judgement result. The supplemental identification may be conducted by manual review. With the supplemental identification unit 400, the accuracy of identifying the phishing websites may be further improved.

Figure 6:
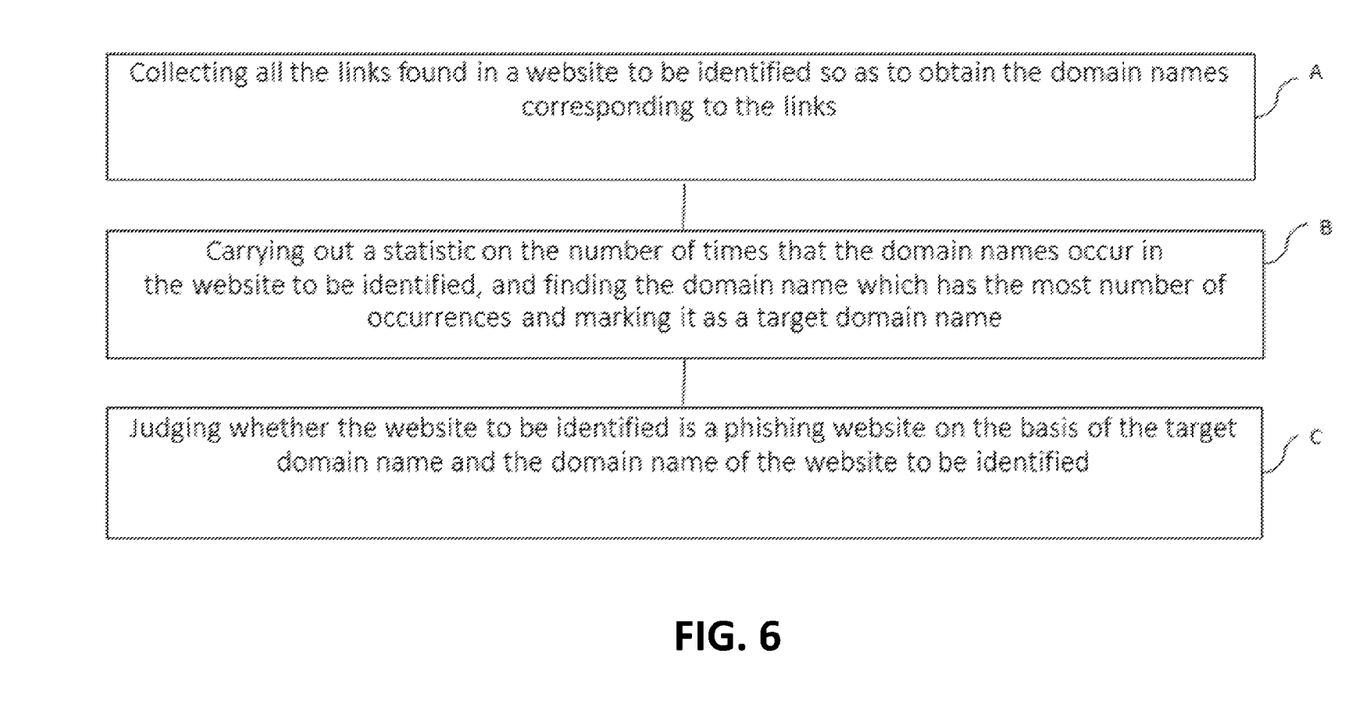
FIG. 6 is a flow chart of the method for identifying one or more phishing website(s) according to a third embodiment of the present invention.

FIG. 6 is a flow chart of the method for identifying a phishing website according to a third embodiment of the present invention. As shown in FIG. 6, the method may include steps of:

A: collecting all the links found in a website to be identified so as to obtain the domain names corresponding to the links. Said domain name corresponding to the link is an absolute address of the link.

B: carrying out a statistic on the number of times that the domain names occur in the website to be identified, and finding the domain name which has the most number of occurrences and marking it as a target domain name.

C: judging whether the website to be identified is a phishing website on the basis of the target domain name and the domain name of the website to be identified.

The step C may further include steps of:

C1: judging whether the target domain name is the same as the domain name of the website, and if yes, judging that the website to be identified is not a phishing website and ending the process; otherwise, proceeding to step C2.

C2: calculating a ratio of the number occurrences of the target domain name to those of the domain name of the website and a similarity between the target domain name and the domain name of the website, and judging whether the website to be identified is a phishing website according to the ratio and the similarity.

The step C2 may further comprise steps of:

C21: calculating the ratio of the occurrences of the target domain name to those of the domain name of the website.

C22: calculating the similarity between the target domain name and the domain name of the website.

The step C22 may further comprise steps of:

C221: establishing a comparison array of the character string of the target domain name and the character string of the domain name of the website, wherein the character string of the target domain name is arranged in the first line of the comparison array and kept in a fixed position, and the character string of the domain name of the website is arranged in the second line of the comparison array and moved from the left side to the right side so as to compare the overlapped characters in the two lines of strings.

C222: calculating a first similarity value $Q_1$ between the target domain name and the domain name of the website when the first character of the target domain name is aligned with the last character of the domain name of the website; calculating a second similarity value $Q_2$ between the target domain name and the domain name of the website when the second character of the target domain name is aligned with the last character of the domain name of the website; in this manner, calculating a m-th similarity value $Q_m$ between the target domain name and the domain name of the website when the last character of the target domain name is aligned with the first character of the domain name of the website; wherein, $m=n_1+n_2-1$, $n_1$ represents the string length of the target domain name, and $n_2$ represents the string length of the domain name of the website.

At said step C222, the i-th similarity value $Q_i$ is calculated by the following formula:

$$Q_i = M_i^2 \times L_i;$$

wherein, i is a natural number and $1 \leq i \leq m$; and, $$M_i = s_i/n_{max};$$

$$L_i = r_i/n_{max};$$

wherein, $r_i$ represents the number of overlapped characters in the character string of the domain name of the website and the character string of the target domain name for the i-th comparison; $n_{max}$ represents the number of characters of a relatively longer character string in the character string of the domain name of the website and the character string of the target domain name; $L_i$ represents an overlapped ratio of the character string of the domain name of the website to the character string of the target domain name for the i-th comparison; $s_i$ represents the number of overlapped and identical characters in the character string of the domain name of the website and the character string of the target domain name for the i-th comparison; and $M_i$ represents a matching ratio of the character string of the domain name of the website to the character string of the target domain name for the i-th comparison.

In addition, at said step C222, the i-th similarity value $Q_i$ may be calculated in the following way:

for the i-th comparison, counting the number of overlapped and identical characters in the character string of the target domain name and the character string of the domain name of the website, and taking the number of overlapped and identical characters as the i-th similarity value $Q_i$.

C223: calculating a similarity $Q_{max}$ between the target domain name and the domain name of the website based on the following formula:

$$Q_{max}=\max\{Q_1, Q_2, Q_3 \ldots Q_m\}$$

C23: judging whether the following requirements are satisfied: the ratio is greater than a predetermined ratio, and the similarity is greater than a predetermined threshold value; and if yes, judging the website to be identified is a phishing website; otherwise, judging the website to be identified is not a phishing website.

Figure 7:
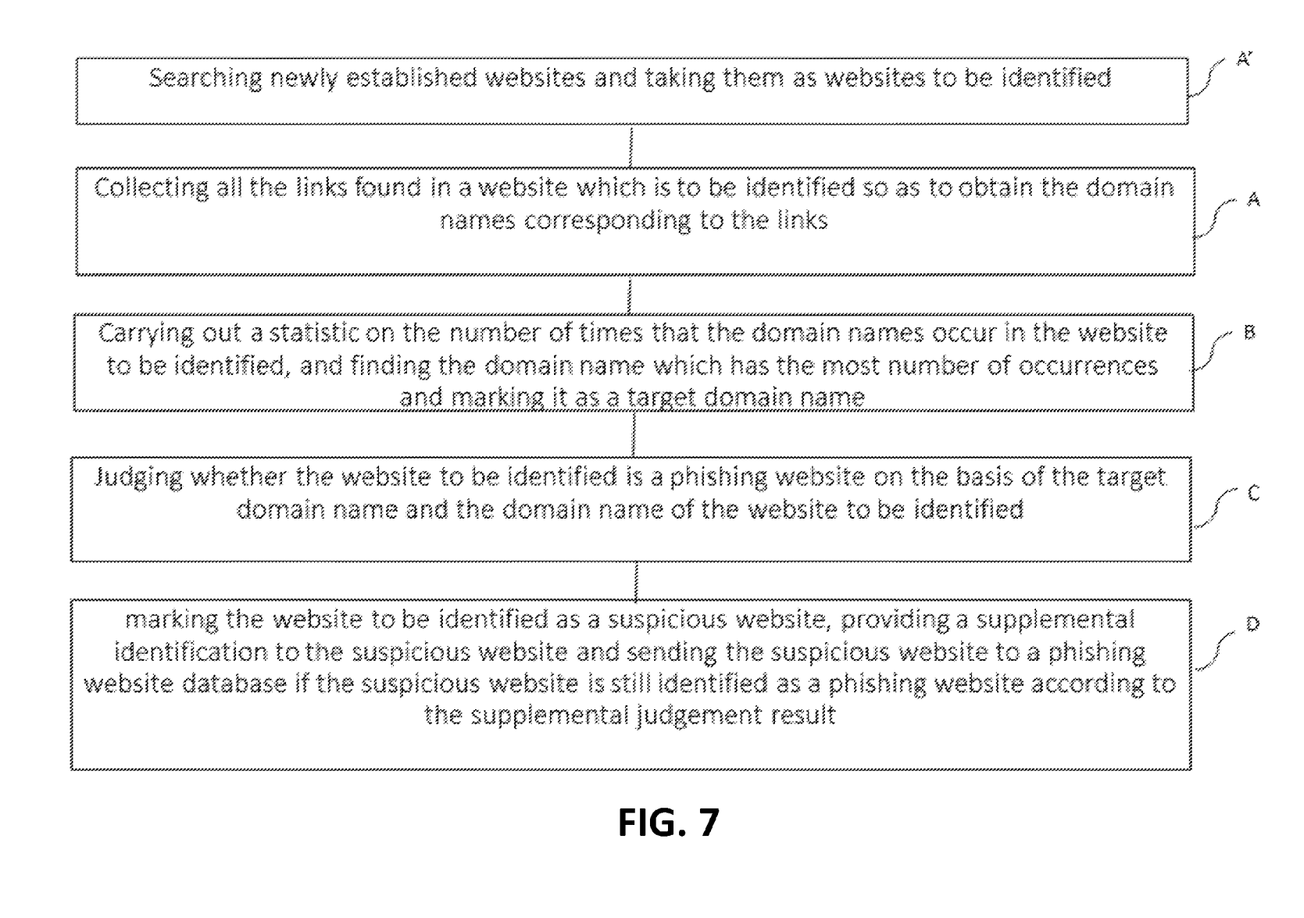
FIG. 7 is a flow chart of the method for identifying one or more phishing website according to a fourth embodiment of the present invention.

FIG. 7 is a flow chart of the method for identifying a phishing website according to a fourth embodiment of the present invention. As shown in FIG. 7, the method in this embodiment is substantially the same as the method in the third embodiment, and the difference is merely in that:

before step A, the method may further comprise a step A' of:
searching newly established websites and taking them as websites to be identified. The search of the newly established website can adopt the following method: monitoring search engine result page through special key words; alternatively, finding websites that netizens seldom visit through the clients.

Following the step C, the method may further comprise a step D of: marking the website to be identified as a suspicious website, providing a supplemental identification to the suspicious website and sending the suspicious website to a phishing website database if the suspicious website is still identified as a phishing website according to the supplemental judgement result. The supplemental identification may be conducted by manual review.

The system and method for identifying a phishing website according to embodiments of the invention may efficiently identify new types of phishing websites by identifying the phishing websites based on a the relations of the links in the websites; meanwhile, it is easy to increase the number and types of the phishing websites in the phishing website database, so as to further identify and search the phishing websites easily, and thereby have broad application prospects in the field of network security.

Embodiment of each component of the present invention can be implemented by hardware, or realized by software modules running on one or more processors, or realized by the combination thereof. A person skilled in the art should understand that a microprocessor or a digital signal processor (DSP) may be used in practical use to realize some or all the functions of some or all the members of the system for identifying a phishing website according to the embodiments of the present invention. The present invention may be further realized as some or all the equipments or device programs for executing the methods described herein (for example, computer programs and computer program products). This program for realizing the present invention may be stored in computer readable medium, or have one or more signal forms. These signals may be downloaded from the Internet website, or be provided by carrying signals, or be provided in any other manners.

Figure 8:
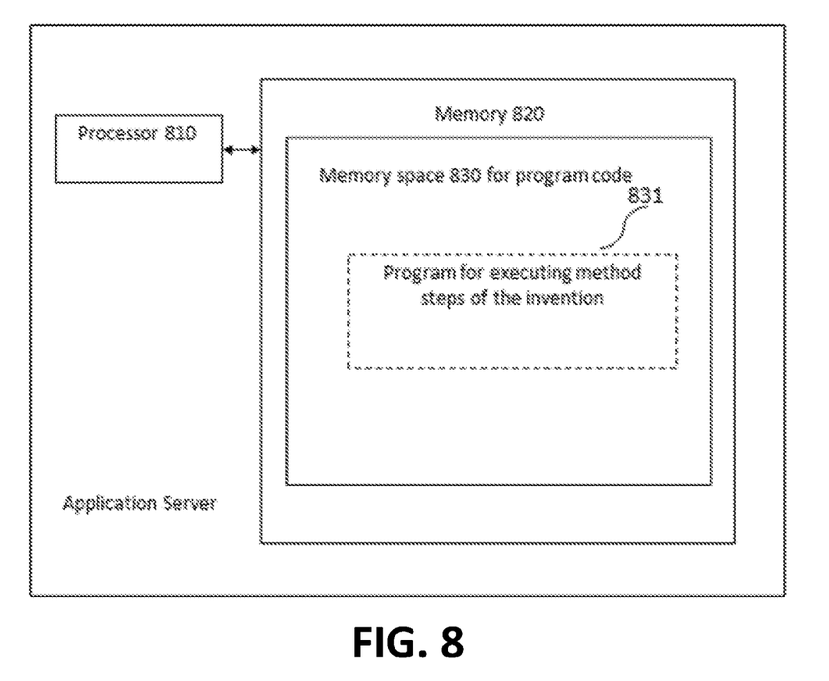
FIG. 8 schematically shows a block diagram of a server for executing the method according to the present invention.
Figure 9:
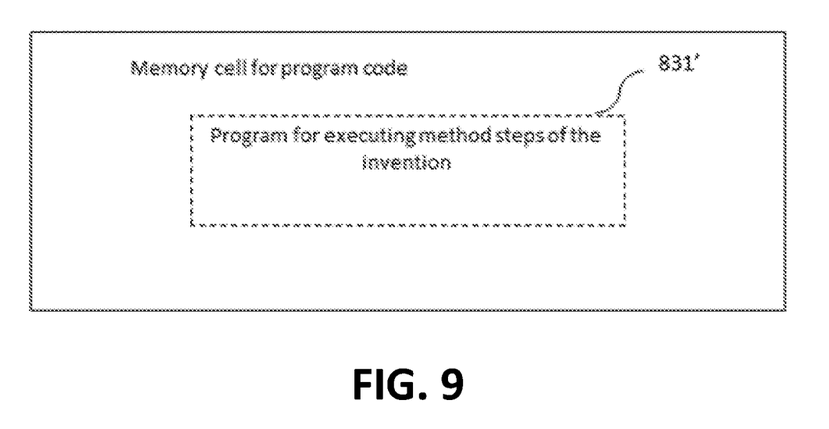
FIG. 9 schematically shows a memory cell for storing and carrying program codes for realizing the method according to the present invention.

For example, FIG. 8 shows a server which may realize the method for identifying phishing website according to the present invention, such as an application server. The server traditionally comprises a processor 810 and a computer program product or a computer readable medium in form of a memory 820. The memory 820 may be electronic memories such as flash memory, EEPROM (Electrically Erasable Programmable Read-Only Memory), EPROM (erasable programmable read only memory), hard disk or ROM. The memory 820 has a memory space 830 of program codes 831 for executing any steps of the above method. For example, the memory space 830 used for the program codes may comprise various program codes 831 of respective step for implementing the above mentioned method. These program codes may be read from one or more computer program products or be written into one or more computer program products. These computer program products comprise program code carriers such as hard disk, compact disk (CD), memory card or floppy disk. These computer program products are usually the portable or stable memory cells as shown in reference FIG. 9. The memory cells may have memory sections, memory spaces, etc., which are arranged similar to the memory 820 of the server as shown in FIG. 8. The program code may be compressed in an appropriate manner. Usually, the memory cell includes computer readable codes 831', i.e., the codes can be read by processors such as 810. When the codes are operated by the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of present invention may be implemented without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets form no limit to the claims. The wording "comprising" is not meant to exclude the presence of elements or steps not listed in a claim. The wording "a" or "an" in front of element is not meant to exclude the presence of a plurality of such elements. The present invention may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as names.

Also, it should be noticed that the language used in the present specification is chosen for the purpose of readability and teaching, rather than for the purpose of explaining or defining the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. A system for identifying a phishing website, comprising:
   a processor; and
   a memory communicatively coupled to the processor and storing instructions that upon execution by the processor cause the system to:
   obtain a plurality of links included in a website and acquire a plurality of domain names corresponding to the plurality of links;
   determine a number of occurrences that the plurality of domain names each occur in the website and identify a target domain name which has a largest number of occurrences among the plurality of domain names;
   determine whether the website is a phishing website based on the target domain name and a domain name corresponding to the website, wherein the instructions that upon execution cause the system to determine whether the website is a phishing website based on the target domain name and the domain name corresponding to the website further comprises instructions that upon execution by the processor cause the system to:
   compare the target domain name and the domain name corresponding to the website;
   determine that the website is not a phishing website when a comparison result shows that the target domain name is the same as the domain name corresponding to the website;
   when the target domain name is different from the domain name corresponding to the website, determine whether the website is a phishing website according to a ratio and a similarity between the target domain name and the domain name corresponding to the website:
   determine the ratio of a number of occurrences of the target domain name to those of the domain name corresponding to the website;
   determine the similarity between the target domain name and the domain name corresponding to the website; and
   determine whether the ratio and the similarity satisfy the following requirements: the ratio is greater than a predetermined ratio, and the similarity is greater than a predetermined threshold; and if yes, determine the website is a phishing website; otherwise, determine the website is not a phishing website.

2. The system according to claim 1, wherein the memory further storing instructions that upon execution by the processor cause the system to;
   establish a comparison array of a character string of the target domain name and a character string of the domain name corresponding to the website, wherein the character string of the target domain name is arranged in a first line of the comparison array and kept in a fixed position, and the character string of the domain name corresponding to the website is arranged in a second line of the comparison array and capable of being moved from a left side to a right side;
   determine a first similarity value $Q_1$ between the target domain name and the domain name corresponding to the website when a first character of the target domain name is aligned with a last character of the domain name corresponding to the website; in this manner, calculate a m-th similarity value $Q_m$ between the target domain name and the domain name corresponding to the website when a last character of the target domain name is aligned with a first character of the domain name corresponding to the website; wherein, $m=n_1+n_2-1$, $n_1$ represents a string length of the target domain name, and $n_2$ represents a string length of the domain name corresponding to the website;
   identify a largest similarity value $Q_{max}$ among a series of similarity values $Q_1, Q_2, \ldots, Q_m$ as the similarity between the target domain name and the domain name corresponding to the website.

3. The system according to claim 2, wherein an $i_{th}$ similarity value $Q_i$ is calculated by the following formula:

$$Q_i = M_i^2 \times L_i;$$

wherein, i is a natural number and $1 \leq i \leq m$; and, $$M_i = s_i/n_{max};$$

$$L_i = r_i/n_{max};$$

wherein, $r_i$ represents a number of overlapped characters in the character string of the domain name corresponding to the website and the character string of said target domain name for the i-th comparison; $n_{max}$ represents a number of characters of a longest character string of the domain name corresponding to the website and said target domain name; $L_i$ represents an overlapped ratio of the character string of the domain name corresponding to the website to the character string of said target domain name for the i-th comparison; $s_i$ represents a number of overlapped and identical characters in the character string of the domain name corresponding to the website and the character string of said target domain name for the i-th comparison; and $M_I$ represents a matching ratio of the character string of the domain name corresponding to the website to the character string of said target domain name for the $i_{th}$ comparison.

4. The system according to claim 2, wherein the i-th similarity value $Q_i$ is calculated in the following way:
   for the i-th comparison, calculating a number of overlapped and identical characters in the character string of the target domain name and the character string of the domain name corresponding to the website as the i-th similarity value $Q_i$.

5. The system according to claim 1, the memory further storing instructions that upon execution by the processor cause the system to:
   mark the website as a suspect website in response to a determination that the website is a phishing website, perform a supplemental identification to the suspect website, and send the suspect website to a phishing website database when the suspect website is still identified as a phishing website according to a supplemental identification result.

6. The system according to claim 1, wherein a domain name corresponding to a link among the plurality of link is an absolute address of the link.

7. The system according to claim 1, wherein the memory further storing instructions that upon execution by the processor cause the system to:
search newly established websites and identify the website.

8. A method for identifying a phishing website, comprising:
acquiring a plurality of links included in a website and obtaining a plurality of domain names corresponding to the plurality of links;
determining a number of occurrences that the plurality of domain names each occur in the website;
identifying a domain name among the plurality of domain names which has a largest number of occurrences; and
determining whether the website is a phishing website based at least in part on a similarity between the target domain name and a domain name corresponding to the website, wherein the determining whether the website is a phishing website based on the target domain name and a domain name corresponding to the website further comprises:
comparing the target domain name and the domain name corresponding to the website;
determining that the website is not a phishing website when a comparison result shows that the target domain name is the same as the domain name corresponding to the website;
when the target domain name is different from the domain name corresponding to the website, determining whether the website is a phishing website according to a ratio and a similarity between the target domain name and the domain name corresponding to the website;
determining the ratio of a number of occurrences of the target domain name to those of the domain name corresponding to the website;
determining the similarity between the target domain name and the domain name corresponding to the website; and
determining whether the following requirements are satisfied: the ratio is greater than a predetermined ratio, and the similarity is greater than a predetermined threshold; and if yes, determining that the website is a phishing website; otherwise, determining that the website is not a phishing website.

9. The method according to claim 8, wherein the calculating the similarity between said target domain name and the domain name corresponding to the website, further comprises:
establishing a comparison array of a character string of the target domain name and a character string of the domain name corresponding to the website, wherein the character string of the target domain name is arranged in a first line of the comparison array and kept in a fixed position, and the character string of the domain name corresponding to the website is arranged in a second line of the comparison array and capable of being moved from a left side to a right side;
calculating a first similarity value $Q_1$ between the target domain name and the domain name corresponding to the website when a first character of the target domain name is aligned with a last character of the domain name corresponding to the website; in this manner, calculate a m-th similarity value $Q_m$ between the target domain name and the domain name corresponding to the website when a last character of the target domain name is aligned with a first character of the domain name corresponding to the website; wherein, $m=n_1+n_2-1$, $n_1$ represents a string length of the target domain name, and $n_2$ represents a string length of the domain name corresponding to the website; and
identifying a largest similarity value $Q_{max}$ among a series of similarity values $Q_1, Q_2, \ldots, Q_m$ as the similarity between the target domain name and the domain name corresponding to the website.

10. The method according to claim 9, wherein an i-th similarity value $Q_i$ is calculated by the following formula:

$$Q_i = M_i^2 \times L_i;$$

wherein, i is a natural number and $1 \leq i \leq m$; and, $$M_i = s_i/n_{max};$$

$$L_i = r_i/n_{max};$$

wherein, $r_i$ represents a number of overlapped characters in the character string of the domain name corresponding to the website and the character string of said target domain name for the i-th comparison; $n_{max}$ represents a number of characters of a relatively longer character string of the domain name corresponding to the website and said target domain name; $L_i$ represents an overlapped ratio of the character string of the domain name corresponding to the website to the character string of said target domain name for the i-th comparison; $s_i$ represents a number of overlapped and identical characters in the character string of the domain name corresponding to the website and the character string of said target domain name for the i-th comparison; and $M_i$ represents a matching ratio of the character string of the domain name corresponding to the website to the character string of said target domain name for the i-th comparison.

11. The method according to claim 9, wherein the i-th similarity value $Q_i$ is calculated in the following way:
for the i-th comparison, calculating a number of overlapped and identical characters in the character string of the target domain name and the character string of the domain name corresponding to the website as the i-th similarity value $Q_i$.

12. The method according to claim 8, further comprising:
in response to a determination that the website is a phishing website, marking the website as a suspect website, performing a supplemental identification to the suspect website and sending the suspect website to a phishing website database when the suspect website is still identified as a phishing website according to a supplemental identification result.

13. The method according to claim 8, wherein a domain name corresponding to a link among the plurality of link is an absolute address of said link.

14. The method according to claim 8, further comprising:
searching newly established websites to identify the website.

15. A non-transitory computer readable medium having instructions stored thereon that, when executed by at least one processor, cause the at least one processor to perform operations for identifying a phishing website, which comprises:
acquiring a plurality of links included in a website and obtaining a plurality of domain names corresponding to the plurality of links;
calculating a number of occurrences that the plurality of domain names each occur in the website;

identifying a domain name among the plurality of domain names which has a largest number of occurrences; and determining whether the website to be identified is a phishing website based at least in part on a similarity between the target domain name and a domain name corresponding to the website, wherein the determining whether the website is a phishing website based on the target domain name and a domain name corresponding to the website further comprises:

comparing the target domain name and the domain name corresponding to the website;

determining that the website is not a phishing website when a comparison result shows that the target domain name is the same as the domain name corresponding to the website;

when the target domain name is different from the domain name corresponding to the website, determining whether the website is a phishing website according to a ratio and a similarity between the target domain name and the domain name corresponding to the website;

determining the ratio of a number of occurrences of the target domain name to those of the domain name corresponding to the website;

determining the similarity between the target domain name and the domain name corresponding to the website; and determining whether the following requirements are satisfied: the ratio is greater than a predetermined ratio, and the similarity is greater than a predetermined threshold; and if yes, determining that the website is a phishing website; otherwise, determining that the website is not a phishing website.

* * * * *